United States Patent Office 3,007,939
Patented Nov. 7, 1961

3,007,939
N-SUBSTITUTED ISOINDOLES
Frederick H. Norton, Concord, Calif., assignor to The Dow Chemical Company, Midland, Mich., a corporation of Delaware
No Drawing. Filed Mar. 23, 1959, Ser. No. 800,964
16 Claims. (Cl. 260—319)

The present invention is concerned with a N-substituted isoindoles and methods for preparing the same.

The N-substituted isoindoles of the present invention are compounds having the formula:

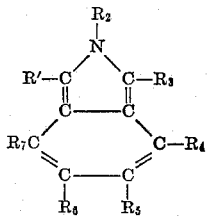

wherein $R_1$, $R_3$, $R_4$ and $R_7$ are independently selected substitutents each with a hydrocarbon skeleton bearing not more than about ten carbon atoms and having a combined atomic weight of from about 15 to about 204 inclusive, and consisting of atoms not other than carbon, hydrogen, oxygen and halogen, $R_2$ is selected from the group consisting of (a) substituents with a hydrocarbon skeleton bearing not more than about twelve carbon atoms and having a combined atomic weight of from about 15 to about 314, inclusive and consisting of atoms not other than carbon, hydrogen, oxygen, nitrogen, sulfur, halogen, and phosphorous, and (b) bifunctional arylene groups, through the agency of which two N-substituted isoindole moieties are combined in one molecule as in the formula:

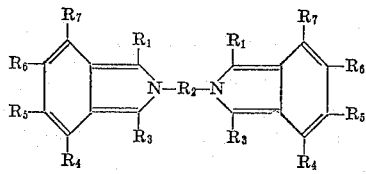

said arylene groups each having a group atomic weight of between 76 and 468, inclusive and $R_5$ and $R_6$ are independently selected from the group consisting of hydrogen and lower alkyl radicals containing up to 4 carbon atoms, inclusive.

The N-substituted isoindoles of the present invention may be prepared by contacting a primary amine with at least 2 mole equivalents of an alkyl gamma-dione in the presence of concentrated hydrochloric or concentrated sulfuric acid at temperatures from about 0° C. to about 250° C. Alternatively, these compounds may be prepared by contacting an N-substituted pyrrole with at least 1 mole equivalent of an alkyl gamma-dione in the presence of concentrated hydrochloric or concentrated sulfuric acid at temperatures from about 0° C. to about 250° C.

Amine starting materials which are suitable include, for example, aniline; chloroaniline; 2-aminophenol; anthranilic acid; 1-naphthylamine; 1,4-phenylenediamine; o-toluidine; ethylaniline; t-butylaniline; dimethylaniline; bromoaniline; dichloroaniline; methoxyaniline; ethoxyaniline; phenylaniline; sulfanilic acid; (p-aminophenyl)-phosphonic acid; aminobenzophenone; aminoacetophenone; 1 - bromo - 2 - naphthylamine; 3 - bromo - 2-naphthylamine; 1,3 - dichloro - 2 - naphthylamine; iodoaniline; iodonaphthylamine; 1-amino-8-naphthol 3,6-disulfonic acid; naphthionic acid; tribromoaniline; o-, m-, and p-nitroaniline; 4,4'-diaminobenzophenone; x,y-diaminonaphthalene; 4,4'-diaminobiphenyl; 4,4'-diaminodiphenyl sulfone; 4,4'-diamino-2,2'-dihalodiphenyl sulfone; 4,4'-diamino-3,3'-dimethyldiphenyl sulfone; and the like.

Pyrrole starting materials which are suitable include, for example, 1,2,5-trimethylpyrrole, 2,5-dimethyl-1-pyrroleethanol, 1-n-butyl-2,5-dimethylpyrrole, 1-methyl-2,5-diphenylpyrrole, 1-isopropyl-2,5-diethylpyrrole, and the like.

Dione compounds which are suitable for reaction with a pyrrole include, for example, 2,5-heptanedione; 2,5-octanedione; 3,6-octanedione; 1-p-tolyl-1,4-pentanedione; 3-methyl-2,5-hexanedione; 3-ethyl-2,5-heptanedione; 3-propyl-2,5-hexanedione; 3,4-dimethyl-2,5-hexanedione; 3,4 - dimethyl - 1 - phenyl - 1,4 - pentanedione; 1,4 - diphenyl - 1,4 - butanedione; 2,5 - hexanedione; 1,4 - di(4-chlorophenyl) - 1,4 - butanedione; 1,4 - bis(methoxyphenyl) - 1,4 - butanedione; 5,5 - dimethyl - 1 - phenyl-1,4 - hexanedione; 3,3 - dimethyl - 2,5 - hexanedione; 2,2,7,7 - tetramethyl - 3,6 - octanedione; 9 - isoamoxy-2,5 - decanedione; 9 - methyl - 2,5 - decanedione; 4,7-decanedione; 4 - ethyl - 2,5 - octanedione; 6 - methyl-2,5 - heptanedione; 2,5 - nonanedione; 2,7 - dimethyl-3,6 - octanedione; 4 - ethyl - 3,6 - octanedione; 1,4 - bis-(p - phenoxyphenyl) - 1,4 - butanedione; 1,4 - bis(chlorophenyl) - 2 - methyl - 1,4 - butanedione; 1,4 - di - 1-naphthyl - 1,4 - butanedione; 1,4 - di - p - tolyl - 1,4-butanedione; 2 - ethyl - 1,4 - diphenyl - 1,4 - butanedione; 2 - methyl - 1,4 - diphenyl - 1,4 - butanedione; 1,4 - diphenyl - 2 - propyl - 1,4 - butanedione; 1 - (p - bromophenyl) - 4 - mesityl - 1,4 - butanedione; 1 - (p - butylphenyl) - 4 - phenyl - 1,4 - butanedione; 1,4 - dimesityl-1,4 - butanedione; 1 - phenyl - 4 - (p - propylphenyl)-1,4 - butanedione; 1 - phenyl - 4 - p - tolyl - 1,4 - butanedione; 1,4 - pentanedione; 1 - anisyl - 1,4 - pentanedione; 1 - phenyl - 1,4 - pentanedione; 1 - (1 - pyrrolyl) - 1,4-pentanedione; 1 - p - tolyl - 1,4 - pentanedione; 1 - (p-hydroxyphenyl) - 1,4 - pentanedione; 1 - (p - methoxyphenyl) - 1,4 - pentanedione; 1,4 - di(4 - iodophenyl)-1,4-butanedione and the like.

Dione compounds which are suitable for reaction with a primary amine, either to make the intermediate pyrrole, or the isoindole directly, are those gamma diones which have only hydrogen atoms attached in the α and β positions, such as, for example, 2,5-hexanedione, 2,5-heptanedione; 1-p-tolyl-1,4-pentanedione, 3,6-octanedione and the like.

The reaction of the gamma dione with an aromatic amine or a pyrrole may be carried out at a temperature from 0° to 250° C. When carried out in the presence of hydrochloric acid the temperature is preferably from about 160° to about 180 C. When carried out in the presence of sulfuric acid the temperature is preferably maintained at about 20° to about 100° C. Reaction time varies from about ½ hour to about 15 hours, and is preferably from about 1 to about 8 hours. Pressures used may be from atmospheric pressure to about 600 p.s.i.g. and are preferably maintained at about 50 to 200 pounds per square inch gauge when hydrochloric acid is used as the condensing agent and at atmospheric pressure when sulfuric acid is used as the condensing agent. Inert, nonaqueous solvents such as, for example, pentane, hexane and benzene may be present if desired when the reactions are carried out in the presence of sulfuric acid. Such solvents are readily removed from the reaction mixture by distillation. These solvents are not used when the reactions are carried out in the presence of hydrochloric acid because of the inconvenient pressures that would be developed at the higher temperatures required. The preferred mode of operation is in the absence of water, although water may be present in those reactions using concentrated hydrochloric acid as the condensing agent.

The reaction ratio of aromatic amine to gamma dione may be as high as 8:1, the stoichiometric and preferable ratio is about 1:2, although other ratios may be used.

The products of the present invention may be separated from the strongly acid reaction mixture by neutralizing with aqueous base, such as, for example, sodium hydroxide, potassium hydroxide, calcium hydroxide, and the like, and separating the insoluble isoindole product by filtration or steam distillation. The isoindoles may be further purified by recrystallization from hot acetone, alcohol, ether, or organic solvent-water mixtures.

The compounds of the present invention are white or colored crystalline solids and are generally soluble in hot organic solvents and strong acid and alkali solutions. They are generally insoluble in water in dilute acids and bases.

These compounds have been found to be useful as foliage fungicides, systemic insecticides, and nemacides. In a representative operation, 100 percent control of the fungus, Colletotrichum lindemuthianum was obtained upon exposure to m-(1,3,4,7-tetramethyl-2-isoindolyl)-phenol at a concentration of ½ pound of the phenol per 100 gallons of spray.

The present invention may be further illustrated by the following examples, but is not to be construed as limited thereto:

*Example 1.—2-phenyl-1,3,4,7-tetramethylisoindole*

A mixture of 65 grams of aniline (0.7 mole), 68 grams of hydrochloric acid (0.7 mole), 17.5 grams of 2,5-hexanedione (0.154 mole), and 20 grams of water was heated to a temperature of 150–160° C. at autogeneous pressure in a pressure reactor for 7 hours. The reaction mixture was made basic and steam distilled to remove unreacted starting materials and other impurities. The residue of crude 2-phenyl-1,3,4,7-tetramethylisoindole weighed 23 grams and melted at 129–134° C.

*Example 2.—2-(p-tolyl)-1,3,4,7-tetramethylisoindole*

A mixture of 76 grams of p-toluidine (0.7 mole), 68 grams of concentrated hydrochloric acid (0.7 mole), 17.2 grams (0.15 mole) of 2,5-hexanedione, and about 15 milliliters of water was heated to a temperature of 160–170° C. in a pressure reactor for 5 hours. The reaction was made basic with sodium hydroxide and steam distilled to remove unreacted starting materials and other impurities. The solid residue was 2-(p-tolyl)-1,3,4,7-tetramethylisoindole.

*Analysis.*—Calculated: N, 5.32 percent. Found: N, 5.16 percent.

*Example 3.—2-(o-chlorophenyl)-1,3,4,7-tetramethylisoindole*

Following the procedure of the above examples the condensation of o-chloroaniline hydrochloride with 2,5-hexanedione yielded 2-(o-chlorophenyl)-1,3,4,7-tetramethylisoindole having a melting point of 117–123° C.

*Example 4.—2-(p-chlorophenyl)-1,3,4,7-tetramethylisoindole*

Following the procedure of the above examples the condensation of p-chloroaniline with 2,5-hexanedione yielded 2-(p-chlorophenyl)-1,3,4,7 - tetramethylisoindole having a melting point of 119–126° C.

*Example 5.—o-(1,3,4,7-tetramethyl-2-isoindolyl)phenol*

In a similar manner the condensation of o-aminophenol and 2,5-hexanedione yielded o-(1,3,4,7-tetramethyl-2-isoindolyl)phenol having a melting point of 189–194° C.

*Example 6.—m-(1,3,4,7-tetramethyl-2-isoindolyl)phenol*

In a similar manner the condensation of m-aminophenol and 2,5-hexanedione yielded m-(1,3,4,7-tetramethyl-2-isoindolyl)phenol having a melting point of 182–190° C.

*Example 7.—p-(1,3,4,7-tetramethyl-2-isoindolyl)phenol*

In a similar manner the condensation of p-aminophenol and 2,5-hexanedione yielded p-(1,3,4,7-tetramethyl-2-isoindolyl)phenol having a melting point of 175–180° C.

*Example 8.—o-(1,3,4,7-tetramethyl-2-isoindolyl)-benzoic acid*

In a similar manner the condensation of anthranilic acid and 2,5-hexanedione yielded o-(1,3,4,7-tetramethyl-2-isoindolyl)benzoic acid.

*Example 9.—2-(alpha-naphthyl)-1,3,4,7-tetramethylisoindole*

In a similar manner the condensation of alpha-naphthylamine with 2,5-hexanedione yielded 2-(alpha-naphthyl)-1,3,4,7-tetramethylisoindole having a melting point of 204–215° C.

*Example 10.—2,2'-p-phenylenebis(1,3,4,7-tetramethylisoindole)*

In a similar manner the condensation of p-phenylenediamine with 2,5-hexanedione yielded 2,2'-phenylenebis-(1,3,4,7-tetramethylisoindole) having a sintering temperature above 300° C.

*Example 11.—1,2,3,4,7-pentaphenylisoindole*

In a similar manner the condensation of aniline hydrochloride with 1,4-diphenyl-1,4-butanedione yielded 1,2,3,4,7-pentaphenylisoindole having a melting point of 84–85° C.

*Example 12.—1,3-dimethyl-2,4,7-triphenylisoindole*

A mixture of 2,5-dimethyl-1-phenylpyrrole (3.42 parts), 1,2-dibenzoylethane (4.76 parts), and 2.6 parts of concentrated hydrochloric acid was heated at 160–170° C. in a pressure reactor for four hours. The reaction mixture was slurried in methanol and dilute hydrochloric acid and filtered. The insoluble portion was 1,3-dimethyl-2,4,7-triphenylisoindole having a melting point of 186–193° C. The filtrate was treated with dilute ammonium hydroxide, the precipitate removed, washed and dried. This material was crude 1,3-dimethyl-2,4,7-triphenylisoindole.

*Example 13.—2,2'-p-phenylenebis(1,3-dimethyl-4,7-diphenylisoindole)*

A mixture of 4.76 parts of 1,2-dibenzoylethane, 2.64 parts of 1,1'-p-phenylenebis(2,5-dimethylpyrrole), and 2.3 parts of concentrated hydrochloric acid was heated in a pressure reactor for 3 hours at 160–170° C. The crude product was crushed, heated with dilute hydrochloric acid, filtered and the insoluble portion again extracted with hot dilute hydrochloric acid, followed by an extraction with hot dilute ammonium hydroxide. After washing and drying, the 2,2'-p-phenylenebis(1,3-dimethyl-4,7-diphenylisoindole) melted at 230–240° C.

*Analysis.*—Calculated: N, 4.20 percent. Found: N, 3.75 percent.

*Example 14.—o-(1,3,4,7-tetramethyl-2-isoindolyl)benzoic acid*

In a similar manner the condensation of o-(2,5-dimethyl - 1 - pyrrolyl)benzoic acid with 2,5 - hexanedione yielded o-(1,3,4,7-tetramethyl-2-isoindolyl)benzoic acid having a melting point of 220–230° C.

*Example 15.—p-(1,3-dimethyl-4,7-diphenyl-2-isoindolyl)benzoic acid*

In a similar manner the condensation of p-(2,5-dimethyl-1-pyrrolyl)benzoic acid with 1,2-dibenzoylethane yielded p-(1,3-dimethyl - 4,7-diphenyl-2-isoindolyl)benzoic acid, having a sintering temperature of 210–230° C.

*Example 16.—p-(1,3-dimethyl-4,7-diphenyl-2-isoindolyl) phenol*

In a similar manner the condensation of p-(2,5-dimethyl-1-pyrrolyl)phenol with 1,2-dibenzoylethane yielded p-1,3,-dimethyl-4,7-diphenyl-2-isoindolyl)phenol having a melting point above 300° C.

*Example 17.—o-(1,3-dimethyl-4,7-diphenyl-2-isoindolyl) phenol*

In a similar manner the condensation of o-(2,5-dimethyl-1-pyrrolyl)phenol with 1,2-dibenzoylethane yielded o-(1,3-dimethyl-4,7-diphenyl-2-isoindolyl)phenol.

*Example 18.—2-(p-tolyl)-1,3,4,7-tetramethylisoindole*

A mixture of 14 grams (75 millimoles) of 2,5-dimethyl-1-(p-tolyl)pyrrole and 8.5 grams (75 millimoles) of 2,5-hexanedione was treated with 1-2 milliliters of concentrated sulfuric acid. The temperature of the mixture rose to boiling. After slight cooling, the mixture was quenched with water and extracted with dilute ammonium hydroxide. The residue was dissolved in acetone, treated with concentrated ammonium hydroxide and filtered. The filtrate was treated with alcohol and evaporated until crystallization occurred. Filtration and drying produced 2-(p-tolyl)-1,3,4,7-tetramethylisoindole having a melting point of 148–160° C. Infrared analysis showed this compound to be identical with the compound produced in Example 2.

*Example 19.—p-(1,3,4,7-tetramethyl-2-isoindolyl) benzoic acid*

A mixture of 2.1 grams (10 millimoles) of p-(2,5-dimethyl-1-pyrrolyl)benzoic acid, 1.2 grams (11 millimoles) of 2,5-hexanedione, and 10 milliliters of pentane was treated with 1 milliliter of concentrated sulfuric acid. When the exothermic reaction subsided the mixture was treated with 70 milliliters of dilute ammonium hydroxide and the pentane distilled off. The mixture was then filtered and the filtrate acidified to yield p-(1,3,4,7-tetramethyl-2-isoindolyl)-benzoic acid as a precipitate which was removed and dried and had a melting point of above 300° C.

*Example 20.—m-(1,3,4,7,-tetramethyl-2-isoindolyl)phenol*

A mixture of 8 grams (43 millimoles) of m-(2,5-dimethyl-1-pyrrolyl)phenol and 5 grams (44 millimoles) of 2,5-hexanedione was treated with 1 milliliter of concentrated sulfuric acid. The temperature of the mixture rose rapidly to 100° C. On quenching with water a solid material formed which was soluble in both strong acids and bases and is readily precipitated from acid solutions by ammonium hydroxide. This precipitate was removed by filtration, washed, and dried. The product was m-(1,3,4,7-tetramethyl-2-isoindolyl)phenol having a melting point above 300° C.

*Example 21.—1,3,4,7-tetramethyl-2-phenylisoindole*

In a manner similar to that of Example 20, the condensation of 2,5-dimethyl-1-phenylpyrrole with 2,5-hexanedione in the presence of concentrated sulfuric acid yielded 1,3,4,7-tetramethyl-2-phenylisoindole having a melting point of 109–117° C.

*Example 22.—o-(1,3,4,7-tetramethyl-2-isoindolyl) benzoic acid*

In a manner similar to that of Example 20, the condensation of o-(2,5-dimethyl-1-pyrrolyl)benzoic acid with 2,5-hexanedione in the presence of sulfuric acid and hexane yielded o-(1,3,4,7-tetramethyl-2-isoindolyl)benzoic acid as a very dark blue solid.

*Example 23.—o-(1,3,4,7-tetramethyl-2-isoindolyl)phenol*

In a manner similar to that of Example 20 the condensation of o-(2,5-dimethyl-1-pyrrolyl)phenol with 2,5-hexanedione in the presence of concentrated sulfuric acid yielded o-(1,3,4,7-tetramethyl-2-isoindolyl)phenol.

*Example 24.—p-(1,3,4,7-tetramethyl-2-isoindolyl)phenol*

In a manner similar to that of Example 20 the condensation of p-(2,5-dimethyl-1-pyrrolyl)phenol with 2,5-hexanedione in the presence of concentrated sulfuric acid yielded p-(1,3,4,7-tetramethyl-2-isoindolyl)phenol having a melting point of 210–220° C.

*Example 25.—2,2'-p-phenylenebis(1,3,4,7-tetramethyl-isoindole)*

In a manner similar to that of Example 20 the condensation of 1,1'-p-phenylenebis(2,5-dimethylpyrrole) with 2,5-hexanedione in the presence of concentrated sulfuric acid and hexane yielded 2,2'-p-phenylenebis(1,3,4,7-tetramethylisoindole) having a melting point of about 360° C.

*Example 26.—4,7-diphenyl-1,2,3-trimethylisoindole*

A mixture of equivalent proportions of 1,2,5-trimethylpyrrole, 1,4-diphenyl-1,4-butanedione, and concentrated hydrochloric acid was heated at 160–170° C. for 4 hours. The mixture was slurried in a solution of methanol and dilute hydrochloric acid and filtered to yield 4,7-diphenyl-1,2,3-trimethylisoindole as an insoluble product and having a melting range of 88–98° C.

*Example 27.—1,2,3,4,7-pentamethylisoindole*

A mixture of 9.5 parts of 1,2,3-trimethylpyrrole, 8.73 parts of 2,5-hexanedione and 8 parts of concentrated hydrochloric acid was heated at a temperature of 160–170° C. for 3 hours and then made basic with ammonium hydroxide and steam distilled until only water was removed. The residue was then collected by filtration and air dried to obtain 1,2,3,4,7-pentamethylisoindole as a pink powder having a melting point of 111–114° C.

*Example 28.—2-methyl-1,3,4,7-tetraphenylisoindole*

A mixture of equivalent proportions of 1-methyl-2,5-diphenylpyrrole and 1,4-diphenyl-1,4-butanedione is slurried with about 3 parts of pentane. The addition of 0.3 part concentrated sulfuric acid starts an exothermic reaction which causes the pentane to boil. The mixture is treated with excess dilute ammonium hydroxide, heated to remove the pentane, and filtered. When the filtrate is made acid the product precipitates and is collected by filtration.

*Example 29.—1-phenyl-2,5-dimethylpyrrole*

Molar equivalents of aniline hydrochloride, 2,5-hexanedione, and hydrochloric acid are heated in a reactor for 2 hours at 100° C. to produce 1-phenyl-2,5-dimethylpyrrole.

In a manner similar to that of the above examples 1-p-tolyl-2,5-dimethylpyrrole may be prepared from p-toluidine hydrochloride and 2,5-hexanedione; 1-(4-hydroxyphenyl)-2,5-dimethylpyrrole may be prepared from 4-aminophenol and 2,5-hexanedione; 1,2,5-triphenylpyrrole may be prepared from aniline hydrochloride and 1,4-diphenyl-1,4-butanedione; and p-phenylenedi(2,5 - dimethylpyrrole) may be prepared from 1,4-phenylenediamine dihydrochloride and four mole equivalents of 2,5-hexanedione; 2-phenyl-1,3,4,7-tetrakis(methoxyphenyl)-isoindole may be prepared by condensing aniline hydrochloride with 2 moles equivalents of 1,4-bis(methoxyphenyl)-1,4-butanedione; and 2-phenyl-1,3,4,7-tetra(4-chlorophenyl)-isoindole may be prepared by condensing aniline hydrochloride with 1,4-di(4-chlorophenyl)-1,4-butanedione; 1,3,4,-7-tetramethyl - 2 - isoindoleethanol by condensing 2,5-dimethylpyrrole-ethanol with 2,5-hexanedione; 2-n-butyl-1,-3 - dimethyl-4,7-di-(4-chlorophenyl)isoindole by condensing 1-n-butyl - 2,5 - dimethylpyrrole with 1,4-di(4-chlorophenyl)1,4-butanedione; 2,4,7 - trimethyl - 1,3 - diphenylisoindole by condensing 1-methyl-2,5-diphenylpyrrole with 2,5-hexanedione; 2-isopropyl-1,3-diethyl-4,7-bis(methoxyphenyl)isoindole, by condensing 1 - isopropyl-2,5-diethylpyrrole with 1,4-bis(methoxyphenyl)-1,4-butanedione; 1,-2,3-trimethyl-4,7-diphenyl-5-propyl-isoindole by condensing 1,2,5-trimethylpyrrole and 2-propyl-1,4-diphenyl-1,4-butanedione; 5 - ethyl-1,3,7-trimethyl-4-propyl-2-isoindole-ethanol by condensing 2,5-dimethyl-1-pyrroleethanol and 4-ethyl-2,5-octanedione; 4,5,7-triethyl - 2 - methyl-1,3-diphenylisoindole by condensing 2,5-diphenyl - 1 - methyl-pyrrole and 4-ethyl-3,6-octanedione; p-(1,3,4,7-tetra-1-napthyl-2-isoindolyl)phenylphosphonic acid by condensing (p-aminophenyl)phosphonic acid and 1,4-di-1-naphthyl-1,4-butanedione; p-(1,7 - bis(p-bromophenyl)-3,4-dimesityl-2-isoindolyl)phenylphosphonic acid and p-(1,4-bis (p-bromophenyl) - 3,7 - dimesityl - 2 - isoindolyl)phenyl-phosphonic acid by condensing (p - aminophenyl)phosphonic acid and 1-(p-bromophenyl)-4-mesityl-1,4-butane-dione; 4 - (1,7-diethyl-3,4-dimethyl - 2 - isoindolyl)-5-hydroxy-2,7-naphthalenedisulfonic acid and 4-(1,4-diethyl-3,7-dimethyl-2-isoindolyl) - 5 - hydroxy-2,7-naphthalene-disulfonic acid by condensing 1-amino-8-naphthol-3,6-disulfonic acid and 2,5-heptanedione; 4-(1,7-dimethyl-3,4-dipropyl-2-isoindolyl)-1-naphthalenesulfonic acid and 4-(1,4-dimethyl-3,7-dipropyl - 2 - isoindolyl)-1-naphthalene-sulfonic acid by condensing naphthionic acid and 2,5-octane-dione; p - (1,3,4,7-tetraethyl-2-isoindolyl)benzene-sulfonic acid by condensing sulfanilic acid and 3,6-octane-dione; 2-(2,4,6-tribromophenyl) - 1,7 - dimethyl-3,4-di-p-tolylisoindole and 2-(2,4,6-tribromophenyl)-1,4-dimethyl-3,7-di-p-tolylisoindole by condensing 2,4,6-tribromoaniline and 1-p-tolyl-1,4-pentanedione; 2,2'-(sulfonylbis-(3-iodo-p-phenylene)-)bis-(1,3,4,7 - tetramethylisoindole) by condensing 4,4'-diamino-2,2'-diiododiphenyl sulfone and 2,5-hexanedione; and the like.

Various modifications may be made in the present invention without departing from the spirit or scope thereof, and it is understood that I limit myself only as defined in the appended claims.

I claim:
1. N-substituted isoindoles having the formula

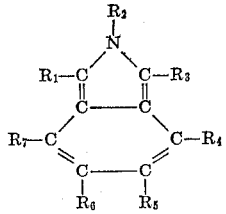

wherein $R_1$, $R_3$, $R_4$ and $R_7$ are hydrocarbon members independently selected from the group consisting of alkyl of 1 to 6 carbon atoms, phenyl, naphthyl, anthryl, and the corresponding halosubstituted alkyl, phenyl, naphthyl and anthryl radicals having halogen atoms from the group consisting of chlorine, bromine and iodine; and wherein $R_2$ is selected from the group consisting of substituted alkyl groups of 2 to 12 carbon atoms, substituted phenyl groups, substituted naphthyl groups, and substituted anthryl groups, said substituents being independently selected from the group consisting of chlorine, bromine, iodine, hydroxyl and carboxyl; and wherein $R_5$ and $R_6$ are independently selected from the group consisting of hydrogen and lower alkyl of 1 to 4 carbon atoms, inclusive.

2. N-substituted isoindoles having the formula

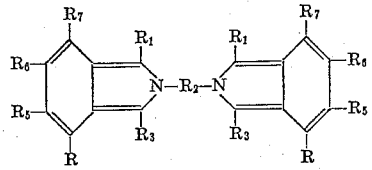

wherein $R_1$, $R_3$, $R_4$, and $R_7$ are hydrocarbon members independently selected from the group consisting of alkyl of 1 to 6 carbon atoms, phenyl, naphthyl, anthryl, and the corresponding halosubstituted alkyl, phenyl, naphthyl and anthryl radicals having halogen atoms from the group consisting of chlorine, bromine and iodine; and wherein $R_2$ is selected from the group consisting of 1,4-phenylene, 4,4'-diphenylene, sulfo-(bis - 4 - phenylene), sulfo-(bis-4-halophenylene), sulfo-(bis-4-tolylene), and carbo-(bis-4-phenylene); and wherein $R_5$ and $R_6$ are independently selected from the group consisting of hydrogen and lower alkyl of 1 to 4 carbon atoms, inclusive.

3. 2-(o-chlorophenyl)-1,3,4,7-tetramethylisoindole.
4. 2-(p-Chlorophenyl)-1,3,4,7-tetramethylisoindole.
5. o-(1,3,4,7-tetramethyl-2-isoindolyl)phenol.
6. m-(1,3,4,7-tetramethyl-2-isoindolyl)phenol.
7. p-(1,3,4,7-tetramethyl-2-isoindolyl)phenol.
8. o-(1,3,4,7-tetramethyl-2-isoindolyl)benzoic acid.
9. 2,2'-p-phenylenebis(1,3,4,7-tetramethylisoindole)
10. 2,2' - p - phenylenebis(1,3 - dimethyl-4,7-diphenyl-isoindole).
11. p-(1,3-dimethyl - 4,7 - diphenyl-2-isoindolyl)bezoic acid.
12. p-(1,3-dimethy-4,7-diphenyl-2-isoindolyl)phenol.
13. o-(1,3-dimethyl-4,7-diphenyl-2-isoindolyl)phenol.
14. p-(1,3,4,7-tetramethyl-2-isoindolyl)benzoic acid.

15. The process of preparing N-substituted isoindoles which includes contacting a primary amine having the formula $R_2NH_2$, wherein $R_2$ is selected from the group consisting of (A) substituted alkyl groups of 2 to 12 carbon atoms, substituted phenyl, substituted naphthyl, and substituted anthryl, said substituents being independently selected from the group consisting of chlorine, bromine, iodine, hydroxyl and carboxyl, and (B) bifunctional arylene groups selected from the group consisting of 1,4-phenylene, 4,4' - diphenylene, sulfo-(bis-4-phenylene), sulfo-(bis-4-halophenylene), sulfo-(bis-4-tolylene), and carbo-(bis-4-phenylene); with at least 2 mole equivalents of an alkyl-gamma-dione having the formula

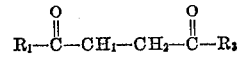

wherein $R_1$ and $R_3$ are independently selected from the group consisting of alkyl of 1 to 6 carbon atoms, phenyl, naphthyl, and anthryl, and the corresponding halosubstituted alkyl, phenyl, naphthyl and anthryl radicals having halogen atoms from the group consisting of chlorine, bromine and iodine, in the presence of a member of the group consisting of concentrated hydrochloric acid and concentrated sulfuric acid at a temperature of from about 0° C. to about 250° C.

16. The process of preparing N-substituted isoindoles which includes contacting an N-substituted pyrrole having the formula

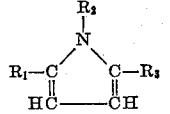

wherein $R_1$ and $R_3$ are independently selected from the group consisting of alkyl of 1 to 6 carbon atoms, phenyl, naphthyl, anthryl, and the corresponding halosubstituted alkyl, phenyl, naphthyl and anthryl radicals having halogen atoms from the group consisting of chlorine, bromine, and iodine; and $R_2$ is selected from the group consisting of (A) substituted alkyl groups of 2 to 12 carbon atoms, substituted phenyl, substituted naphthyl, and substituted anthryl, said substituents being independently selected from the group consisting of chlorine, bromine, iodine, hydroxyl and carboxyl, and (B) bifunctional arylene groups selected from the group consisting of 1,4-phenylene, 4,4'-diphenylene, sulfo-(bis-4-phenylene), sulfo-(bis-4-halophenylene), sulfo-(bis-4-tolylene), and carbo-(bis-4-phenylene); with at least one mole equivalent of an alkyl-gamma-dione having the formula

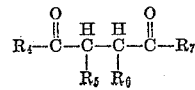

wherein $R_4$ and $R_7$ are hydrocarbon members independently selected from the group consisting of alkyl of 1 to 6 carbon atoms, phenyl, naphthyl, anthryl and the corresponding halosubstituted alkyl, phenyl, naphthyl and anthryl radicals having halogen atoms from the group consisting of chlorine, bromine and iodine; and $R_5$ and $R_6$ are independently selected from the group consisting of hydrogen and lower alkyl of 1 to 4 carbon atoms, inclusive, in the presence of a member of the group consisting of concentrated hydrochloric acid and concentrated sulfuric acid at a temperature of from about 0° to 250° C.

References Cited in the file of this patent

Allen et al.: J. Org. Chem., vol. 2 (1938), pp. 235–244.

Theilacker et al.: Annalen der Chemie, vol. 597 (1955), pp. 95–103.

Theilacker et al.: Annalen der Chemie, vol. 605 (1957), pp. 43–49.

UNITED STATES PATENT OFFICE
CERTIFICATION OF CORRECTION

Patent No. 3,007,939                                November 7, 1961

Frederick H. Norton

It is hereby certified that error appears in the above numbered patent requiring correction and that the said Letters Patent should read as corrected below.

Column 7, lines 69 to 70, for the lower portion of the formula reading "R", each occurrence, read -- $R_4$ --; column 8, lines 35 to 37, the formula should appear as shown below instead of as in the patent:

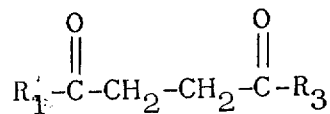

Signed and sealed this 17th day of April 1962.

(SEAL)
Attest:

ESTON G. JOHNSON
Attesting Officer

DAVID L. LADD
Commissioner of Patents